(12) United States Patent
Kothari et al.

(10) Patent No.: US 10,701,586 B2
(45) Date of Patent: *Jun. 30, 2020

(54) WIRELESS CONTROL OF TIGHTLY SPACED MACHINES

(71) Applicant: Amazon Technologies, Inc., Seattle, WA (US)

(72) Inventors: Sachin Rajendra Kothari, Issaquah, WA (US); Samuel Gardner Garrett, Seattle, WA (US); Seshachalamgupta Motamarri, Redmond, WA (US); Timothy Alan Talda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,871

(22) Filed: Apr. 5, 2019

(65) Prior Publication Data

US 2019/0239116 A1 Aug. 1, 2019

Related U.S. Application Data

(63) Continuation of application No. 15/795,017, filed on Oct. 26, 2017, now Pat. No. 10,278,095.

(51) Int. Cl.
*H04W 28/04* (2009.01)
*G05B 19/18* (2006.01)
(Continued)

(52) U.S. Cl.
CPC .......... *H04W 28/04* (2013.01); *B25J 9/1674* (2013.01); *B25J 13/006* (2013.01); *B25J 13/065* (2013.01); *B60L 3/04* (2013.01); *E02F 9/205* (2013.01); *G05B 19/048* (2013.01);

*G05B 19/18* (2013.01); *G06Q 10/0834* (2013.01); *G06Q 50/28* (2013.01); *H04B 7/026* (2013.01);
(Continued)

(58) Field of Classification Search
CPC ..................................................... H04W 28/04
USPC .......................................................... 370/329
See application file for complete search history.

(56) References Cited

U.S. PATENT DOCUMENTS

2013/0208822 A1 8/2013 Zhang et al.
2015/0274421 A1 10/2015 Yamada
(Continued)

*Primary Examiner* — Joel Ajayi
(74) *Attorney, Agent, or Firm* — Patterson + Sheridan, LLP

(57) ABSTRACT

Embodiments herein describe wireless transmission techniques for mitigating interference between wirelessly controlled machines in a shared space. To mitigate interference, the machines may be assigned different channels within the same frequency band. However, if machines using the same channel in a frequency band receive each other's wireless signals, the wireless signals can interfere. To free up additional bandwidth, in one embodiment, the command signals are transmitted using a different frequency band than a heartbeat signal used to stop the machines in case of emergencies. In another embodiment, time multiplexing or directional antennas can be used to mitigate interference. In another example, antenna diversity and multiple-input-multiple output (MIMO) can be used to further focus the radiation pattern onto the desired machine while avoiding transmitting wireless signals to neighboring machines. In one embodiment, the machines may use dual-channels to transmit and receive duplicate data.

18 Claims, 10 Drawing Sheets

(51) Int. Cl.
  *H04B 7/26* (2006.01)
  *B25J 9/16* (2006.01)
  *G06Q 10/08* (2012.01)
  *H04B 7/06* (2006.01)
  *B25J 13/06* (2006.01)
  *E02F 9/20* (2006.01)
  *H04B 7/026* (2017.01)
  *G06Q 50/28* (2012.01)
  *B25J 13/00* (2006.01)
  *H04J 3/16* (2006.01)
  *H04Q 11/04* (2006.01)
  *G05B 19/048* (2006.01)
  *B60L 3/04* (2006.01)
  *H04W 16/28* (2009.01)
  *H04B 7/0452* (2017.01)
  *H04L 12/26* (2006.01)
  *H04W 74/08* (2009.01)
  *H04B 7/024* (2017.01)
  *H04W 72/04* (2009.01)

(52) U.S. Cl.
  CPC ......... *H04B 7/0452* (2013.01); *H04B 7/0617* (2013.01); *H04B 7/0697* (2013.01); *H04B 7/2618* (2013.01); *H04J 3/1682* (2013.01); *H04L 43/10* (2013.01); *H04Q 11/04* (2013.01); *H04W 16/28* (2013.01); *H04W 74/0841* (2013.01); *H04B 7/024* (2013.01); *H04B 7/0669* (2013.01); *H04W 72/046* (2013.01); *H04W 72/0453* (2013.01); *Y10S 901/01* (2013.01)

(56) References Cited

U.S. PATENT DOCUMENTS

2016/0156400 A1   6/2016  Fakhrai et al.
2017/0192427 A1*  7/2017  Bivans ............... G05B 19/0421

* cited by examiner

US 10,701,586 B2

WIRELESS CONTROL OF TIGHTLY SPACED MACHINES

CROSS-REFERENCE TO RELATED APPLICATIONS

This application is a continuation of co-pending U.S. patent application Ser. No. 15/795,017, filed on Oct. 26, 2017. The aforementioned related patent application is herein incorporated by reference in its entirety.

BACKGROUND

Automation relies on machines to perform tasks such as transporting items between locations in a warehouse, assembling or manufacturing products, sorting items, packaging items, removing items from packaging, and the like. The machines may be controlled using wireless signals from a controller. Bandwidth becomes limited as more and more machines which rely on wireless control are spaced closer together. For example, to reduce the amount of occupied floor space (e.g., the footprint), a manufacturer or distributor may space the wirelessly controlled machines such that the wireless signals transmitted for controlling one machine can interfere with the wireless signals transmitted to another, neighboring machine.

To mitigate interference, the wireless signals transmitted to one machine may use a different wavelength (or range of wavelengths) than the wireless signals transmitted to another machine. In this manner, the machines can be allocated different portions of the bandwidth using non-interfering wireless signals. However, as the density of machines increases, the amount of bandwidth (e.g., the available wavelengths) becomes limited. Because of bandwidth constraints, the same wavelengths may be used to transmit controls to two different machines. If the signals transmitted to one of the machines reach the other machine, the signals can cause interference which prevents that machine from reliable receiving the wireless signals intended for it.

BRIEF DESCRIPTION OF DRAWINGS

Various embodiments in accordance with the present disclosure will be described with reference to the drawings, where like designations denote like elements.

DETAILED DESCRIPTION

Figure 1:
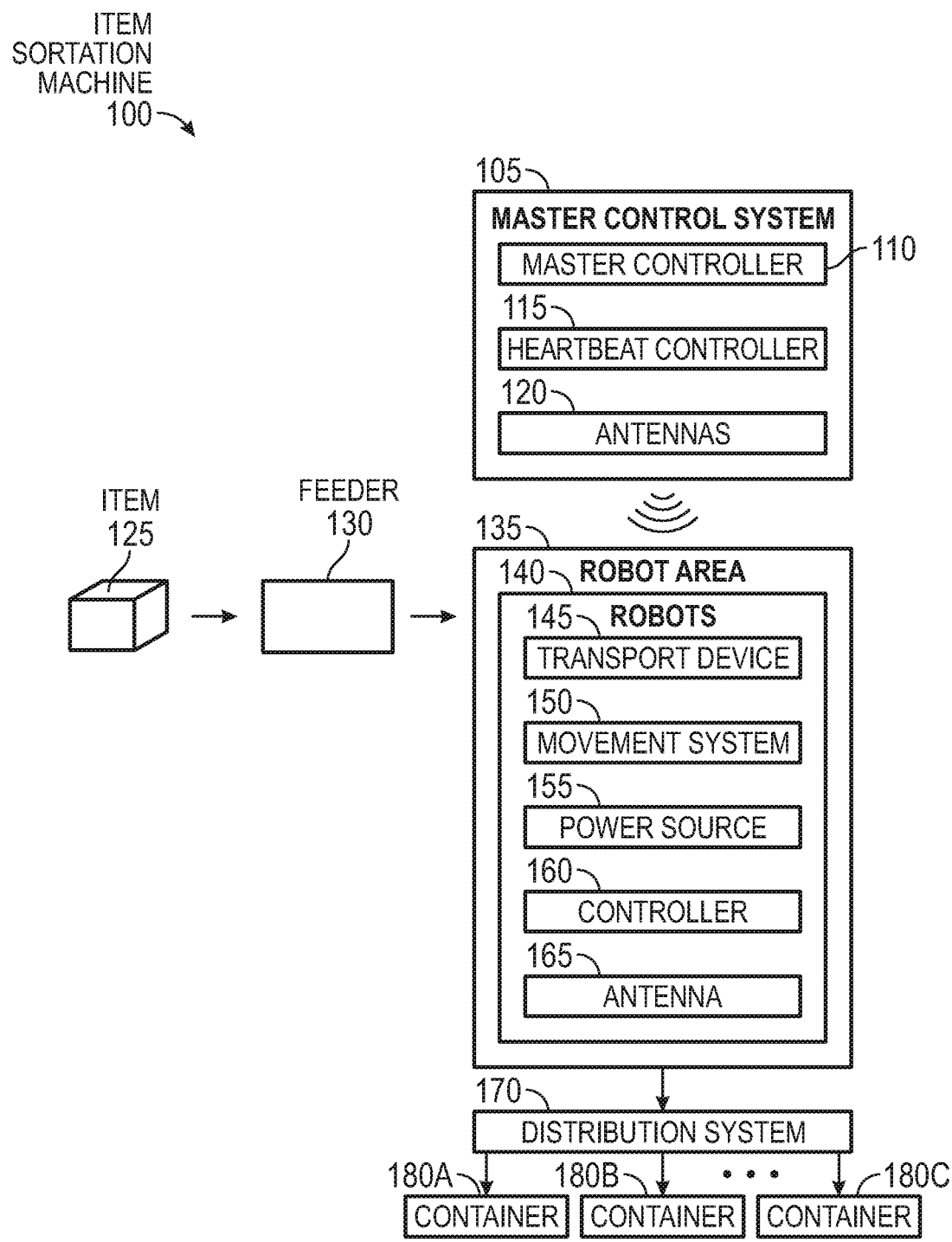
FIG. 1 illustrates an item-sortation machine, according to various embodiments.

Embodiments herein describe wireless transmission techniques for mitigating interference between wirelessly controlled machines in a shared space—e.g., a warehouse or plant. As the density of the machines increases, the demand for bandwidth may also increase. For example, many wireless communication standards—e.g., IEEE 802.11a/b/g/n/ac/ad—provide different channels for allocating bandwidth within their defined frequency band (e.g., 2.4 GHz, 5 GHz, or 60 GHz). That is, the different channels may correspond to a different wavelength or range of wavelengths in the frequency band. For example, each channel in the 2.4 GHz frequency band is 20 MHz wide. Machines that use different channels in the frequency band can generally communicate without interfering with each other (although some portions of the channels may be overlapping). However, wireless signals in the 2.4 GHz and 5 GHz frequency bands can travel up to 100 feet. Moreover, different machines may require multiple channels to operate. If the channels have to be re-used (e.g., different machines use the same channels to communicate) and the machines are not spread far enough apart, then the wireless signals can interfere with each other and prevent the corresponding machines from reliably receiving the signals. However, spreading out the machines to prevent interference means that more floor space (e.g., a bigger footprint) is required to operate the machines which may increase costs. The wireless techniques described herein permit the machine density to be increased while mitigating the likelihood the wireless signals intended for one machine interfere with another machine.

Many machines use a heartbeat signal (e.g., a continuous signal) as an emergency stop (E-stop) signal to stop the machines in case of an emergency. The heartbeat signal also requires bandwidth in the frequency band (although the bandwidth may be smaller than the bandwidth use to transmit operational commands to the machines). In one embodiment, the heartbeat signal is assigned to a first frequency band while the operational commands are assigned to a second frequency band. For example, the heartbeat signal may be assigned to the 2.4 GHz band while the operational commands are transmitted on the 5 GHz band (or vice versa). To mitigate interference between neighboring machines, the machines may be assigned different channels within the same frequency band. For example, Machine A is assigned Channel 1, Machine B is assigned Channel 2, and so forth. However, there are a limited number of channels in each frequency band and some machines may require multiple channels further restricting the bandwidth. Thus, the channels may have to be reused which can result in interference if the machines are within wireless range of each other. For example, wireless signals for IEEE 802.11a/b/g/n/ac have a range up to approximately 100 feet. If machines using the same channel in one of these IEEE frequency bands are within 100 feet of each other, the wireless signals can interfere.

In one embodiment, time multiplexing is used to mitigate interference. The machines can all use the same channel (or channels) but at different times. For example, Machine A may use the channel during a first time slot, Machine B uses the channel during a second time slot, Machine C during a third time slot, and so forth. Because only one machine is using the channel at a time, the signals cannot interfere. However, this reduces the amount of data that can be transmitted to the machines since they receive/transmit signal only during their time slot. However, multiple channels in the 2.4 of 5 GHz bands could be used to send data which can increase the bandwidth, or the machines may use a higher bandwidth frequency band such as IEEE 802.11ad which has a 60 GHz frequency band.

In one embodiment, a directional antenna can be used to mitigate interference between machines. The directional antenna can be positioned to focus the wireless signals (i.e., the antenna's radiation pattern) into an area that includes only one machine which may mitigate the amount of wireless signals that propagate in a direction away from the machine. As such, the machines can be spaced closer or permit the machines to use the same channels to transmit data with little or no interference. In another example, antenna diversity and multiple-input-multiple output (MIMO) can be used to further focus the radiation pattern onto the desired machine while not transmitting wireless signals to neighboring machines.

In one embodiment, the machines may use dual-channels to transmit and receive data. That is, a controller may transmit the same data using two channels in the same frequency band to the machine. Even if a neighboring machine is using the same channels at the same time, the likelihood the wireless signals for a neighboring machine will interfere with both channels is low. To further decrease the risk of interference, antenna diversity and MIMO can be used to reduce the likelihood the wireless signals propagate between neighboring machines.

FIG. 1 illustrates an item-sortation machine 100, according to various embodiments. Generally, the machine 100 sorts received items 125 into containers 180 using wirelessly controlled robots 140. However, the wireless communication techniques described herein are not limited to such and can be used in any wireless controlled machine (or robot(s)) such as a machine for moving containers or racks in a warehouse, removing an item from a package, packing an item into a shipping container, picking an item, and the like. The embodiments herein can be used in any machine that relies on wireless control signals which can interfere with other wireless controlled machines in a shared area (e.g., a warehouse, sorting facility, mail processing facility, packing facility, etc.).

The sortation machine 100 includes a master control system 105, a feeder 130, a robot area 135, and a distribution system 170. The master control system 105 provides the wireless control signals using a master controller 110 and antenna 120 (e.g., a transmit antenna) which control the actions of the robots 140 in the robot area 135. For example, the master control system 105 may wirelessly send move commands, pick-up commands, drop commands, stop commands, and the like which control how the robots 140 move themselves, and the item 125, in the robot area 135. The master control system 105 also includes a heartbeat controller 115 which uses the antennas 120 to transmit a wireless heartbeat (or E-stop) signal to the robots 140. In one embodiment, the robots 140 perform the commands received from the master controller 110 only as long as the heartbeat signal is received. That is, if the heartbeat controller 115 stops sending the heartbeat signal, the robots immediately stop (e.g., within a few millisecond) their current task. In one embodiment, the heartbeat signal is used to stop the robots 140 in the case of an emergency or a malfunction. Because the robots 140 could hurt a human near the machine 100 or damage the machine 100 during a malfunction, once an emergency is detected, the heartbeat controller 115 can deactivate the heartbeat signal which immediately stops the robots 140 to prevent harm to a human operator or the machine 100 itself. The heartbeat controller 115 may deactivate the heartbeat signal in response to a human operator pressing an emergency button, detecting a malfunctioning robot 140, sensor information (e.g., a vibration sensor), and the like. Once the emergency is handled, the heartbeat controller 115 can resume transmitting the heartbeat signal which indicates to the robots 140 they can begin to perform the commands received from the master controller 110.

In one embodiment, the master controller 110 and the heartbeat controller 115 include processors or micro-controllers. The master controller 110 and the heartbeat controller 115 can include solely hardware and firmware or can include combinations of hardware and software elements. Although not shown, the control system 105 can include master controllers 110 for multiple different machines 100. For example, the control system 105 can refer to multiple independently operating master controllers 110 for controlling respective machines 100, synchronized master controllers 110, or a single master controller 110 which controls multiple different machines 100.

The feeder 130 is a structure that moves the item 125 into the robot area 135. For example, the robot area 135 may be an enclosure that establishes an area where the robots 140 move. The feeder 130 may be a chute which slides the item 125 into a receiving area in the robot area 135, a conveyor belt which moves the packages into the area 135, or a container in which a human places the items 125. In any case, the robots 140 can retrieve the item 125 once the item 125 arrives in the robot area 135 and use the commands received from the master control system 105 to move the item to the distribution system 170 where the item is stored in one of the containers 180.

The machine 100 can include any number of robots 140, e.g., one, two, three, four, etc. As shown, each robot 140 includes a transport device 145, a movement system 150, a power source 155, a controller 160, and at least one antenna 165. The transport device 145 permits the robot 140 to carry the item 125 to different locations in the robot area 135. For example, the robot area 135 may be a fenced off enclosure on the warehouse floor or a frame which includes tracks which the robots 140 can follow. The robots 140 can move along the floor and/or vertically using the frame. In another example, a portion of the robots 140 (or the entire robot) may remain stationary in the robot area 135. For instance, the base of the robot 140 may be anchored while an extension of the robot (e.g., a robotic arm) can move to pick up the items 125 and move them to different locations. The transport device 145 may include a claw or suction cup for lifting or picking the item 125. In another example, the transport device 145 may be a conveyor that receives the item 125 from a conveyor belt in the feeder 130. In another embodiment, the transport device 145 may be a bin in which the feeder 130 places the item 125.

The movement system 150 may move the entire robot 140 or a portion of the robot 140 within the robot area 135. For example, the movement system 150 may include wheels or bearings which permit the robot 140 to move along the floor or along tracks. In another example, the movement system 150 includes an arm attached to the transport device 145 to move the item 125. For example, the robot area 135 may include a central conveyor belt that moves received items 125 past the robots 140. The master controller 110 can instruct a selected one of the robots 140 to pick up the item 125 as it passes using the movement system 150 and the transport device 145 to place the item 125 into the distribution system 170.

The power source 155 in the robots 140 can be a battery or a capacitor. For example, the robots 140 may move relative short distances (e.g., less than 50 feet) before they return to recharge. In that case, the charge on a large capacitor (or capacitors) can be sufficient to move the robot 140 before the robot 140 returns to a charging station or rail to recharge the capacitor. The advantage of using a capacitor as the power source 155 is that it can provide high currents and recharge in a shorter time than a battery, although either is acceptable. In another example, if the entire robot 140 does not move within the robot area 135, then the robot can be connected to a power grid (e.g., plugged into a power outlet) where the power source 155 can be a power converter.

The controller 160 can be a processor or a micro-controller which receives commands from the master controller 110 using the antenna 165 and issues corresponding commands to the transport device 145 and movement system 150. For example, if the master controller 110 instructs the robot 140 to move the item 125 to a particular location in the robot area 135, the controller 160 in turn issues one or more commands to the movement system 150 to move the robot to the desired location. In one embodiment, in addition to receiving information from the master controller 110, the controller 160 can transmit information to the master controller 110. For example, the controller 160 may use the antenna 165 to inform the master controller 110 when a command has been completed successfully. The controller 160 may send other information wirelessly to the master controller 110 such as the charge on the power source 155, status of the transport device 145 or movement system 150 (if there is a malfunction or needs repair), if the item 125 was dropped, and the like. In one embodiment, the controller 110 may be entirely hardware, but in other embodiments may include a combination of hardware/firmware and software.

In one embodiment, the distribution system 170 receives the item 125 from the robot 140 and places the item 125 in one of the containers 180. The distribution system 170 may be multiple access apertures (e.g., a filing system) with corresponding chutes that lead to the containers 180. Using the transport devices 145, the robots 140 can move the items 125 through the apertures in the distribution system 170 and into the containers 180. In another example, the distribution system 170 may include fasteners or platforms for coupling the containers 180 to the distribution system 170. For instance, distribution system may form a rack on which the containers 180 are mounted. The robots 140 can travel to the portion of the rack that stores the corresponding container 180 for the package and place the item 125 into the container 180.

In one embodiment, the containers 180 are assigned different destinations either within the warehouse or to an external location (e.g., a different warehouse or mailing code). Moreover, the containers 180 may correspond to different shipping companies. In one embodiment, the master controller 110 knows the desired destination of the items 125, which may be determined by scanning a bar code or reading an RFID tag on the item 125 when in the feeder 130. The master controller 110 can then provide instructions to the robots 140 to move the item 125 to the appropriate location in distribution system 170 such that the item 125 is stowed in the container 180 corresponding to its destination. In this manner, the item-sortation machine 100 can provide wireless commands to the robots 140 for sorting received items 125 into the containers 180.

Figure 2:
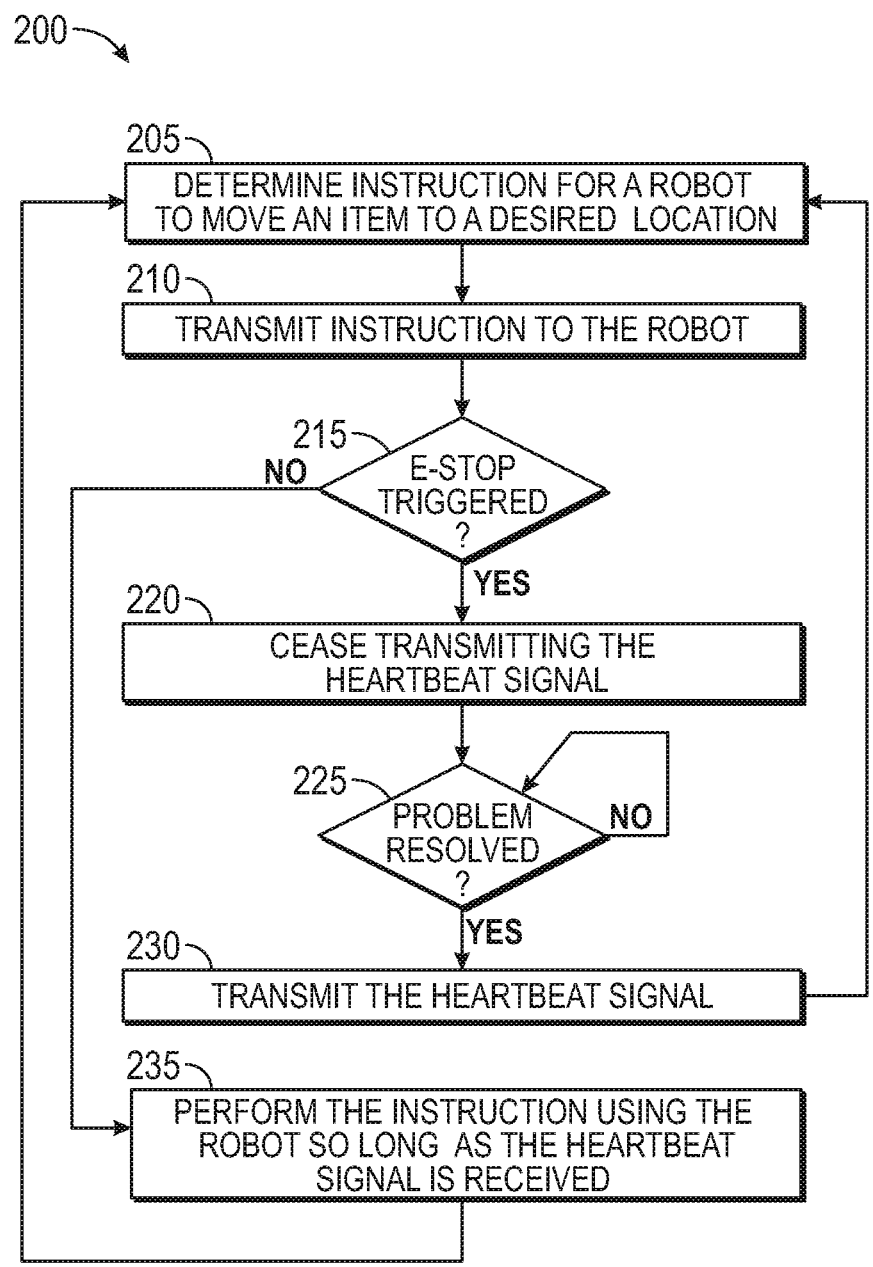
FIG. 2 is a flowchart for controlling robots in a machine using a heartbeat signal and wireless instructions, according to various embodiments.

FIG. 2 is a flowchart of a method 200 for controlling robots in a machine using a heartbeat signal and wireless commands, according to various embodiments. For ease of explanation, the method 200 describes controlling the robots 140 in the item-sortation machine 100 shown in FIG. 1. However, the method 200 can be used to control any kind of wireless controlled machine such as a single robot or a cluster of robots.

At block 205, the master controller determines instructions for a robot to move an item to a desired location. For example, the master controller may instruct the robot to pick up an item, move the item (or itself) to a different location, drop of the item, transfer the item to another robot, and the like. As used herein, the wireless command can include any command sent from the master controller to the robot to control the actions of the robot.

At block 210, the master controller wirelessly transmits the instruction to the robot. The master controller may transmit the instruction to a transmitter in the control system which uses on or more antennas to transmit commands to receivers in the robots. The transmitter in the control system can use various wireless transmission algorithms such as antenna diversity and MIMO to mitigate interference between neighboring machines.

At block 215, the heartbeat controller determines whether an E-stop has been triggered. For example, the machine (or the surrounding area) may include emergency stop buttons that can be pressed by a human operator in case of an emergency or malfunction. For example, if the operator needs to retrieve a dropped package or notices a malfunctioning robot, the operation can press the emergency button which triggers the E-stop. In another embodiment, the heartbeat controller triggers the E-stop without human input. The heartbeat controller may monitor sensors in the machine or receive periodic or emergency status updates for the robots. Using this information, the heartbeat controller can determine to trigger the E-stop.

If the E-stop is triggered, the method 200 proceeds to block 220 where the heartbeat controller ceases transmitting the heartbeat signal. In one embodiment, the heartbeat signal is a continuous signal with a predictable pattern such as a sine wave, a square wave, or a periodic pulse. In one example, the robots 140 may not receive commands using the heartbeat signal but rather monitor the signal to make sure they can continue to operate. Stated differently, the heartbeat signal may not transmit digital data to the robots but instead provides a deactivation signal for stopping the robots. As such, when the heartbeat controller stops transmitting the heartbeat signal at block 220, the controller in the robot may immediately stop the robot from moving (if currently moving) and prevent the robot from carrying out any commands that may be received from the master controller. In one embodiment, the controller in the robot may put the robots in a passive state so that the robots can be easily moved by the operator (in case the robot has malfunctioned or needs to be moved to address a safety concern or to retrieve a fallen item).

To improve safety, it may be desired that robots stop immediately when the heartbeat signal stops (e.g., less than a second and preferably less than a few milliseconds). As such, the embodiments herein describe techniques for mitigate interference that may occur from wireless signals transmitted by neighboring machines in a shared area. For example, separate heartbeat signals may be transmitted to neighboring machines. If those heartbeat signals reach both machines, then they can interfere with each other such that the robots may incorrectly determine that the heartbeat signal has ceased and stop its current action. Alternatively, if the E-stop is triggered for one of the machines, the robots in that machine may still receive the heartbeat signal intended for a neighboring machine and continue to operate which can lead to an unsafe situation.

If at block 225 the heartbeat controller determines the problem which triggered the E-stop is resolved, the method proceeds to block 230 where the heartbeat controller resumes transmitting the heartbeat signal and the master controller can resume normal control and operation of the robots in the machine. However, if the problem has not been resolved, the absence of the heartbeat signal keeps the machine in a shutdown state.

Returning to block 215, if the E-stop has not been triggered, the robot performs the command so long as the heartbeat signal is received. That is, in addition to checking that the heartbeat signal is active when a new command is received at the robot, the controller in the robot may continue to perform the action or actions indicated in the command only as long as the heartbeat signal remains active. For example, the controller may have a separate detection system which continually monitors the heartbeat signal to detect when the signal stops. In response, the detection system transmits an interrupt or override signal which stops the other functions in the controller. So long as the heartbeat signal remains active, the method 200 can repeat with the robots in the machine receiving new instructions or commands from the master controller and performing those commands.

Figure 3:
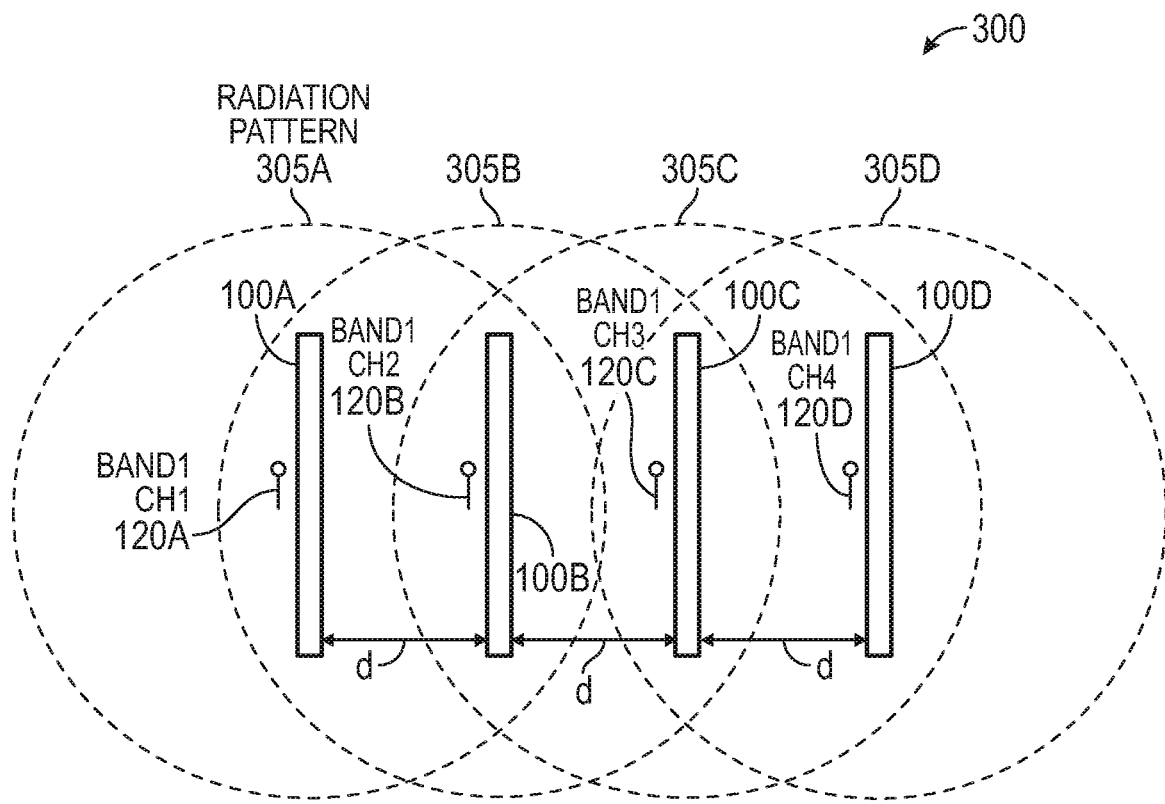
FIG. 3 illustrates using multiple wireless frequency bands and multiple channels to mitigate interference between tightly spaced machines, according to various embodiments.

FIG. 3 illustrates using multiple wireless frequency bands and multiple channels to mitigate interference between tightly spaced machines, according to various embodiments. Specifically, FIG. 3 illustrates a top view of a shared space 300 (e.g., floor space in a warehouse, fabrication plant, assembly plant, sort center, etc.) that includes a plurality of machines 100 which are spaced a distance (d) apart. Each of the machines 100A-D corresponds to an antenna 120A-D used by respective master controllers (not shown) for transmitting commands to the machines 100. The machines 100 may include one or more robots (not shown) which then receive the commands to perform corresponding actions.

Each of the antennas 120 have a corresponding radiation pattern 305 which graphically represent the distance the wireless signals travel within the shared space 300. For the 2.4 GHz frequency band which is defined by IEEE 802.11b/g/n standards and the 5 GHz frequency band which is defined by IEEE 802.11a/h/j/n/ac standards, the signals may propagate up to 100 feet. Thus, given the circular radiation pattern shown in FIG. 3 (as viewed from the top), the wireless signals transmitted by the antennas 120 may reach neighboring machines that are within 100 feet. Here, the distance (d) is less than 100 feet such that the radiation patterns 305 overlap at least one, if not two or more of the neighboring machines 100.

To prevent or mitigate interference between the machines, in this embodiment, the heartbeat signals are assigned to a different frequency band than the command signals. For example, the heartbeat signal may be transmitted on the 2.4 GHz frequency band while the command signals used to control the machines 100 are transmitted on the 5 GHz frequency band (or vice versa). In this manner, interference between the heartbeat signal and the command signals are mitigated. However, as shown by the radiation pattern 305A, the heartbeat or commands signals transmitted by the antenna 120A can reach the machine 100B which means the wireless signals for controlling the machine 100A can cause interference at the machine 100B. To mitigate this intra-band interference, the wireless signals can be assigned to different channels within the frequency band. For example, the command signals transmitted to machine 100A use Channel 1 in Frequency Band 1, the command signals transmitted to machine 100B use Channel 2 in Frequency Band 1, the command signals transmitted to machine 100C use Channel 3 in Frequency Band 1, and so forth. Similarly, the heartbeat signals transmitted to machine 100A can use Channel 1 in Frequency Band 2, the heartbeat signals transmitted to machine 100B use Channel 2 in Frequency Band 2, the heartbeat signals transmitted to machine 100C use Channel 3 in Frequency Band 2, and so forth. In this manner the command signals are allocated different portions of the bandwidth in Frequency Band 1 while the heartbeat signals are allocated different portions of the bandwidth in Frequency Band 2. The antennas 120 assigned to transmit the command and heartbeat signals for the machines 100A-D can transmit these signals in parallel with little or no interference despite the overlapping radiation patterns 305.

In one embodiment, the heartbeat signal is assigned to use the frequency band that has the least amount of bandwidth between the two frequency bands (e.g., the fewest number of channels). That is, because the heartbeat signal may not transmit data but rather a continuous signal, it may have more flexible bandwidth requirements than the command signals, and use less bandwidth. Moreover, instead of assigning a separate channel for each machine 100 for the heartbeat signal, multiple machines 100 may use the same heartbeat signal. For example, if there are not enough channels in the frequency band for each machine 100 to have its own channel for transmitting the heartbeat signal, multiple machines may use the same channel to receive the heartbeat. Thus, if any one of the machines in the group trigger an E-stop, all of the machines 100 in the group stop. Stopping all the machines in the group may be acceptable so that a machine does not continue to operate even though an E-stop was triggered because a neighboring machine 100 within wireless range uses the same channel to transmit its heartbeat signal. By grouping the machines to use the same heartbeat signal so that the channels are not reused by different heartbeat controllers, the operator can ensure that a machine (which triggered an E-stop) does not inadvertently receive a heartbeat signal on the same channel intended for a different machine.

If the distances (d) between the machines 100 shrinks and additional machines 100 are added to the shared space, there may not be enough pre-defined channels in the frequency bands to assign unique channels to each of the machines as shown in FIG. 3. Alternatively, the bandwidth of a single channel may not be sufficient to provide data to the robots in each of the machines 100. For example, using a single channel may be sufficient to transmit the command signals if each of the machines 100 has less than five robots, but if the machines 100 have more than five robots than at least two channels are used, and if the machines 100 have more than ten robots, at least three channels are used. As such, multiple channels may be assigned to each of the machines 100 to transmit the command signals. In either case, the frequency bands may not have a sufficient number of channels to assign all the machines 100 within the radiation patterns 305 of each of the machines 100 a unique channel (or channels). For example, if a frequency band has only twenty channels but there are twenty other machines 100 within the radiation pattern 305A of the antenna 120A for the machine 100A, then the human operator may have to use the same channel assigned to the machine 100A to one of the other machines within the radiation pattern 305A which can cause interference. Thus, the embodiments described in FIG. 3 can be combined with other embodiments described below (or other embodiments may be used instead of what is shown in FIG. 3) to mitigate interference when the machine density increases or when there is no more available bandwidth (e.g., all the channels in the frequency bands have been used).

Figure 4A:
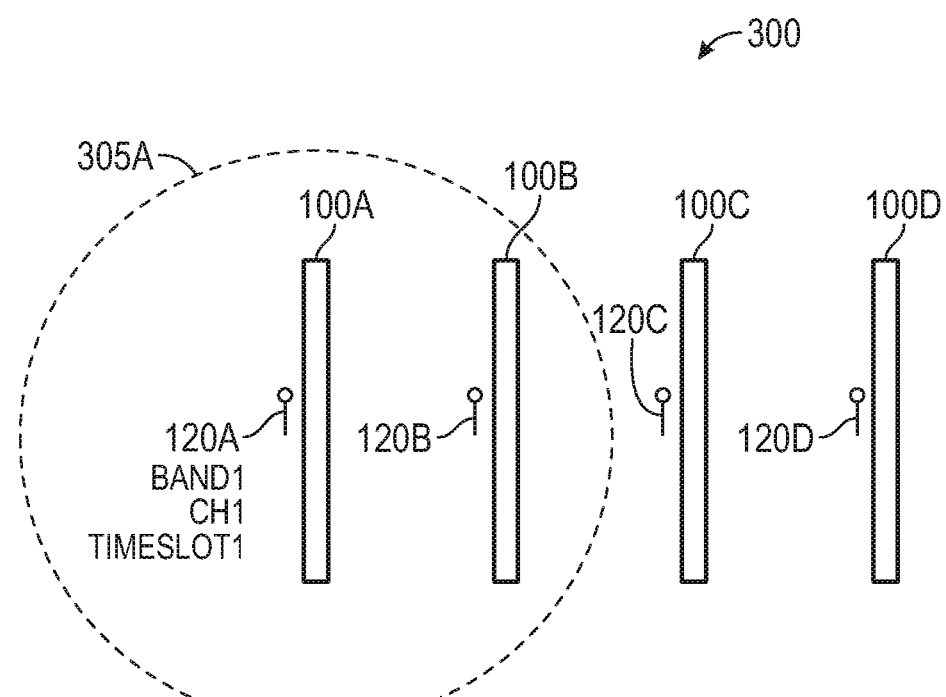
FIGS. 4A and 4B illustrate using time multiplexing to mitigate interference between tightly spaced machines, according to various embodiments.
Figure 4B:
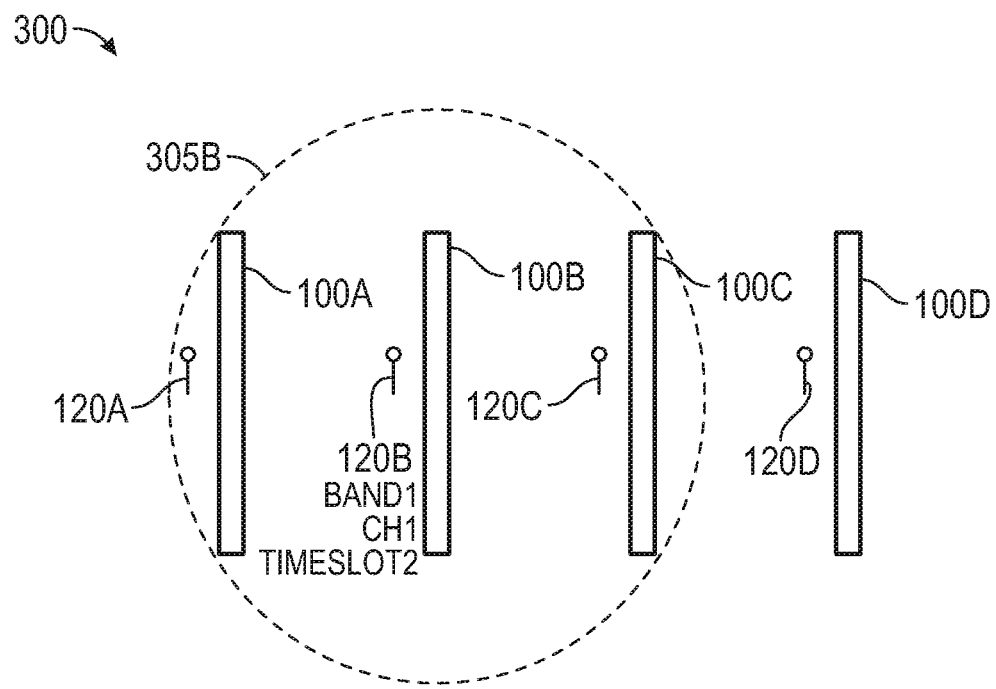

FIGS. 4A and 4B illustrate using time multiplexing to mitigate interference between tightly spaced machines, according to various embodiments. FIG. 4A illustrates the shared space 300 that includes the machines 100 but uses time multiplexing to mitigate interference. For example, the embodiments in FIG. 4A may be used if the machine density or bandwidth requirements in the shared space 300 does not permit using the wireless strategy shown in FIG. 3. In FIGS. 4A and 4B, each of the machines 100 is assigned a respective timeslot or time slice to perform wireless communication during which time the antennas 120 for the other neighboring machines 100 are not transmitting wireless signals.

In FIG. 4A, the antenna 120A transmits wireless signals while the antennas 120 for the other wireless machines (i.e., machines 100B-D) are unused. For example, the antenna 120A may transmit command signals on Channel 1 of Frequency Band 1 without having to worry about interference from the neighboring machines 100. Moreover, although FIG. 4A illustrates assigning only one channel, in other embodiments multiple channels can be used by the machines 100 during their respective timeslots. For example, each of the machines 100 may use Channels 1-10 during their timeslot to transmit command signals. Thus, even though the machines cannot transmit command signals continuously, they can use multiple channels to transmit more commands than could be transmitted if only one channel is used. For example, when not transmitting, the master controllers for the machines 100 may queue the commands for the machine and then transmit the queued commands during the next timeslot.

In one embodiment, the heartbeat signal is time multiplexed in the same manner as shown in FIGS. 4A and 4B; however, this means the machines 100 can perform the commands only during their timeslot. Instead, the heartbeat controller may continuously transmit the heartbeat signal so that the machines 100 can operate continuously. For example, even though in FIG. 4A only the antenna 120A is transmitting commands to the machine 100, the other machines 100 can nonetheless be operating using commands that were received previously. For example, in a previously time slot, the master controller for the machine 100B may have instructed a robot to move four centimeters or to activate its conveyor belt to pick up an item. Because it may take the robot several seconds to complete this command, so long as the heartbeat signal is still being received, the controller in the robot can issue instructions to perform this command even if the robot is not currently wirelessly communicating with the master controller. Because the heartbeat signal may require less bandwidth than the command signals, there may be sufficient available bandwidth to permit each machine 100 to have its own channel for the heartbeat signal (or share the same channel) so that the heartbeat signals can be transmitted continuously.

In FIG. 4B, the antenna 120A has ceased transmitting the command signals (e.g., its timeslot has ended) and the antenna 120B begins transmitting during the timeslot assigned to the machine 100B (i.e., Timeslot 2). Again, if the heartbeat signal is transmitted continuously for all the machines 100, the robots in the machine 100A can continue to operate to perform the commands received during Timeslot 1. In this manner, each of the machines can transmit command signal during respective timeslot using the same channels without interference.

In one embodiment, multiple antennas may transmit command signals simultaneously in the shared space 300. For example, each machine 100 may not use all the channels to transmit data during its timeslot. As such, a neighboring machine may use the remaining channel to transmit data during the same timeslot. For example, the machine 100A may use Channels 1-5 during Timeslot 1 to transmit command signals in parallel with the machine 100D using Channels 6-10 to transmit command signals. Because the machines 100 use different channels, there is little or no interference. Of course, if two machines are sufficient far away in the shared space 300 such that the signals transmitted by one machine cannot interfere with the signals received by the other machine, then both machines can transmit command signals using the same channel or channels. The operator may identify which machines 100 in the shared space 300 are sufficiently far away from a selected machine (e.g., machine 100A or 100B) such that there is no interference, and then determine which machines can use the same timeslot to transmit wireless signals using the same channel as the selected machine.

In one embodiment, the master controllers for each of the machines 100 are synchronized so that each controller knows when to transmit the command signals. For example, the master controllers for the machines 100A-D may share the same clock signal or periodically transmit synchronization signals to each other to ensure that two of the antennas 120 are not transmitting on the same channel in parallel. For example, once the machine 100A determines its timeslot has expired, it can notify the master controller for the machine 100B to begin its timeslot. In another embodiment, instead of having separate master controllers for each machine 100, there is one master controller for all the machines 100 which can manage the timeslots for the machines 100.

Figure 5:
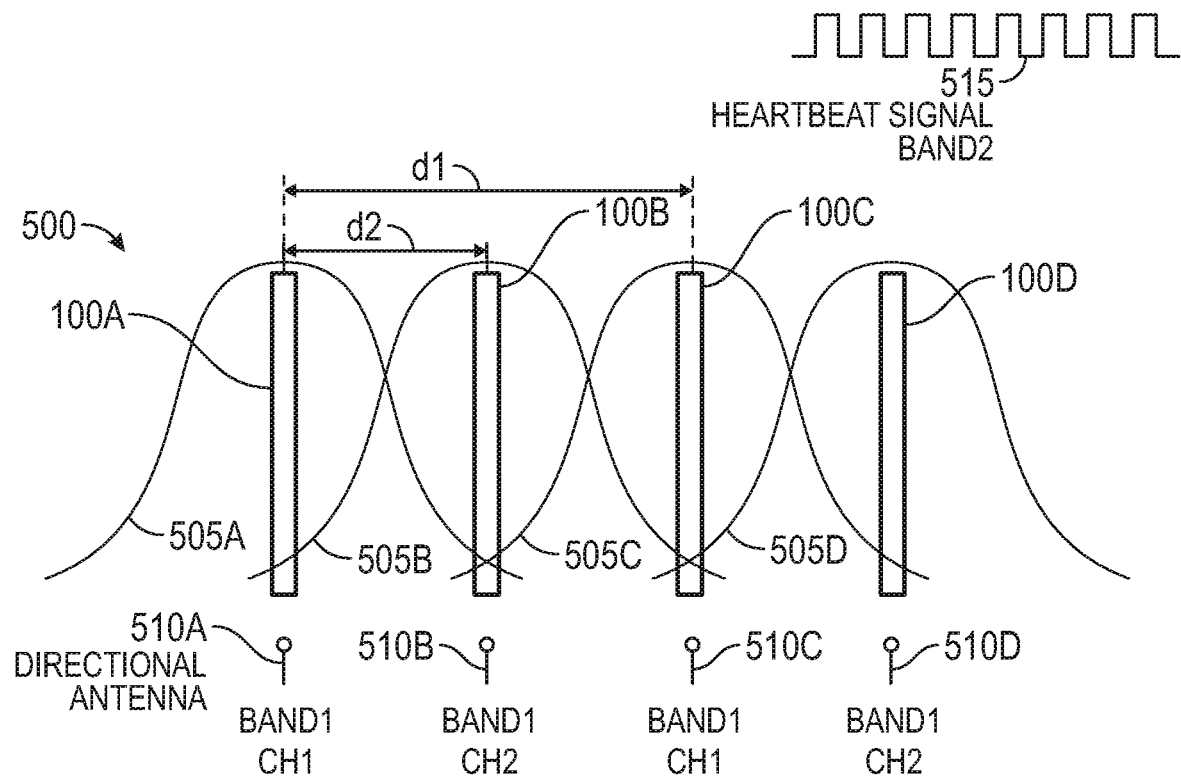
FIG. 5 illustrates changing assigned channels between neighboring machines, according to various embodiments.

FIG. 5 illustrates changing assigned channels between neighboring machines 100, according to various embodiments. As shown, FIG. 5 illustrates a shared space 500 that includes the machines 100A-D that each have a respective a directional antenna 510A-D. Instead of omnidirectional antennas 120 as shown in FIGS. 3 and 4A-4B, the directional antennas 510 have directional radiation patterns 505. In this example, the radiation patterns 505 include at least one main lobe which covers a respective machine 100. The main lobes taper as they approach neighboring machines 100 which reduces the likelihood that, for example, the wireless command signals transmitted by the directional antenna 510A interfere with the receivers in the machine 100B. That is, the directional antennas 510 may be configured or arranged in the shared space 500 such that neighboring machines are in nulls for the radiation patterns 505 to reduce interference.

In FIG. 5, the directional antennas 510 transmit wireless command signals simultaneously to the machines 100. That is, in one embodiment, the machines 100 are not time multiplexed. A distance d2 between a machine (e.g., the machine 100A) and its direct neighbor (e.g., the machine 100B) may be short enough (e.g., less than 30 feet) such that the command signals transmitted by the antennas 510 can interfere. As such, the directly neighboring machines 100 are assigned different channels in the frequency band. That is, the antenna 510B uses Channel 2 but the directly neighboring antennas 510A and 510C use Channel 1. Because the distance d1 may be large enough (e.g., more than 30 feet) such that the wireless signals transmitted by the antenna 510A do not interfere with the machine 100C (or the machine 100D), the antenna 510A and 510C can use the same channel. Thus, using the directional antennas 510 with narrowed beam patterns 505 can mean the operator assigns two different channels (or two different groupings of channel such as Channels 1-5 and 6-10) to directly neighboring machines.

Of course, if the distances d1 and d2 are shrunk further, the radiation pattern 505A may also overlap with the machine 100C which can cause interference. As such, the machine 100C may be assigned to communicate using Channel 3 to mitigate interference. Moreover, the machine 100D could use Channel 1 since it may be outside the radiation pattern 505A used by the machine 100A. In another example, as the distance d2 increases (or the directional antenna 510A has a sufficiently narrow radiation pattern 505A), all of the machines 100 can use the same channel (or group of channels) so long as the radiation patterns 505 do not overlap with the directly neighboring machines 100.

In FIG. 5, the heartbeat signal 515 is assigned to a different frequency band (e.g., Frequency Band 2) from the frequency band used by the command signals. If the heartbeat signal 515 is also transmitted using a directional antenna, then the heartbeat signals 515 can be assigned using a similar scheme as the command signals shown in FIG. 5. For example, given the distances d1 and d2 shown here, the heartbeat signal 515 for the machine 100A may be transmitted on Channel 1 of the Frequency Band 2, the heartbeat signal 515 for the machine 100B is assigned Channel 2 of the Frequency Band 2, the heartbeat signal 515 for the machine 100C is assigned Channel 1 of the Frequency Band 2, and so forth. As the distances d1 and d2 vary, so can the channel assignments for the heartbeat signal 515. In another embodiment, the heartbeat signal 515 is transmitted in the same frequency band (e.g., the Frequency Band 1) as the command signals. For example, the heartbeat signal may be shared by all the machines 100A-D in FIG. 5 and use Channel 3 of the Frequency Band 1, in which case the heartbeat signal may be transmitted using an omnidirectional antenna. Or, the radiation pattern 505 (or the distances between the machines 100) may permit the machines 100 to use the same channel of the same frequency band without interference from a neighboring antenna transmitting its independent heartbeat signal 515.

Figure 6:
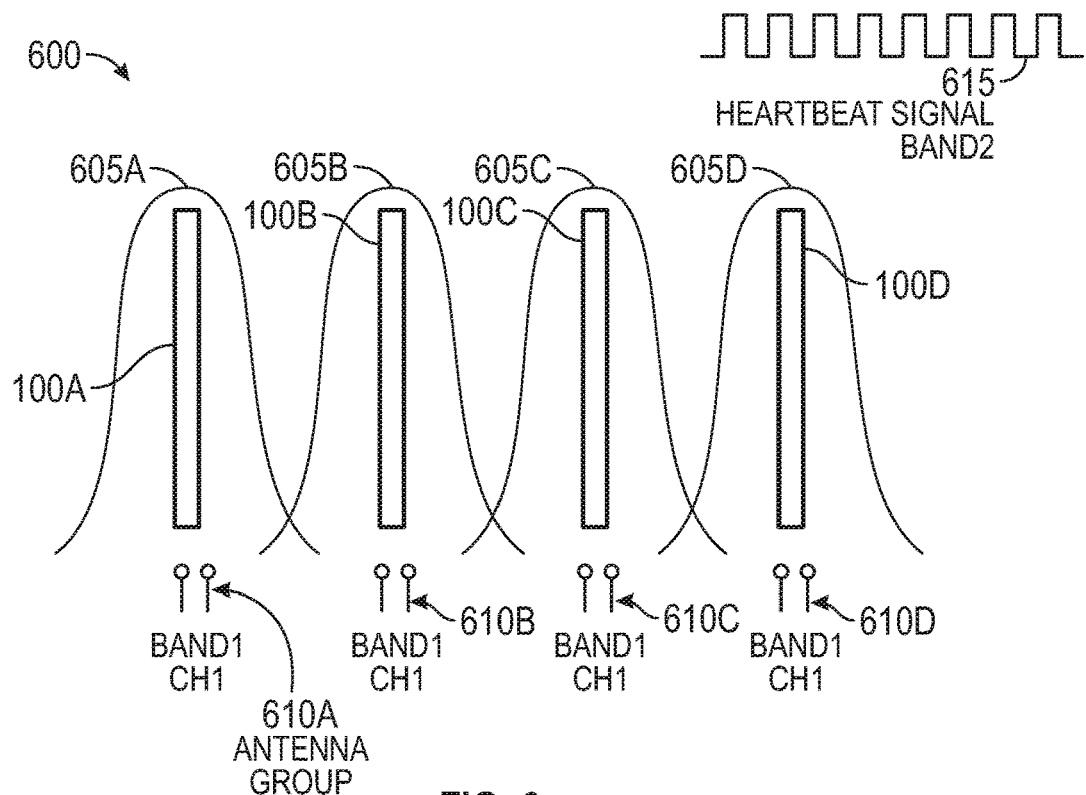
FIG. 6 illustrates using multiple antennas to mitigate interference between tightly spaced machines, according to various embodiments.

FIG. 6 illustrates using multiple antennas to mitigate interference between tightly spaced machines, according to various embodiments. As shown, FIG. 6 illustrates a shared space 600 where multiple antennas arranged in antenna groups 610 transmit command signals to the machines 100. That is, instead of using one antenna to transmit command signals to the machines using one or more channels, each machine 100 has multiple antennas in an antenna group 610 to transmit the data signals. The antenna groups 610 can be assigned a single channel or multiple channels in a frequency band.

In one embodiment, the antenna groups 610 use antenna diversity and MIMO. Doing so provides the master controllers for the machines 100 with more control of the radiation patterns 605 corresponding to the antenna groups 610. In one embodiment, in addition to having multiple antennas for transmitting the command signals, each robot in the machines 100 includes multiple receive antennas for receiving the command signals. For example, MIMO uses multiple transmit and receive antennas to exploit multipath propagation in the shared space 600. Using precoding (or beamforming), the master controller uses the antenna group 610 to cause constructive interference of the signals emitted by the antennas at a particular location within the machines 100. That is, the master controller can increase the received signal at a robot by making signals emitted from the different antennas to add up constructively and to reduce the effect of multipath fading. Thus, MIMO permits the master controller to further control the radiation pattern 605 to reduce interference between the neighboring machines 100. In FIG. 6, the antenna groups 610 can all use the same channel (or plurality of channels) to transmit commands to the machines with little or no interference.

Using MIMO and antenna diversity can permit the machines 100 to be spaced closer together than, for example, using the omnidirectional antennas 120 shown in FIG. 3 or the directional antennas 510 in FIG. 5. For example, the machines 100 in FIG. 5 may have to spread out a distance of at least 30 feet to prevent interference if all the machines 100 are assigned the same channel. By using antenna groups 610 and MIMO, the machines 100 in FIG. 6 may be spaced less than 30 feet apart and still use the same channel (or same group of channels) to communicate. If the distance between the machines 100 is reduced further, then the operator can assign the channel like what is shown in FIG. 5 where directly neighboring machines 100 are assigned different channels. However, the distances between the machines 100 in FIG. 6 may be smaller than the distances between the machines in FIG. 5 thereby increasing the density of the machines and enable a more efficient use of the shared space 600.

Further, the antennas in the antenna groups 610 may be directional antennas. That is, the use of directional antennas can be combined with antenna diversity and MIMO in order to further reduce the radiation patterns 605 and mitigate or prevent interference between the machines 100.

The heartbeat signal 615 may be assigned to the same frequency band used by the command signals (e.g., Frequency Band 1) or a different frequency band (e.g., Frequency Band 2). If the heartbeat signal 615 is also transmitted using an antenna group implementing antenna diversity and MIMO, then the heartbeat signals 615 can be assigned using a similar scheme as the command signals shown in FIG. 6 where individually controllable heartbeat signals 615 are transmitted without worrying about interference. In other embodiments, the heartbeat signal 615 is transmitted using a single antenna (e.g., without MIMO) in which case heartbeat signal 615 may be assigned different channels for the machines 100 to mitigate interference, or the signal 615 may be shared by multiple machines 100 in which case the heartbeat signal 615 may be transmitted using an omnidirectional antenna rather than a directional antenna to increase its coverage area. As an example of the latter, the machines 100A-D may use the same heartbeats signal 615 which may reduce deployment cost, although this means if one of the machines 100 experiences an E-stop and the heartbeat signal 615 is not transmitted, all the machines listening for the heartbeat signal 615 also stop.

Figure 7:
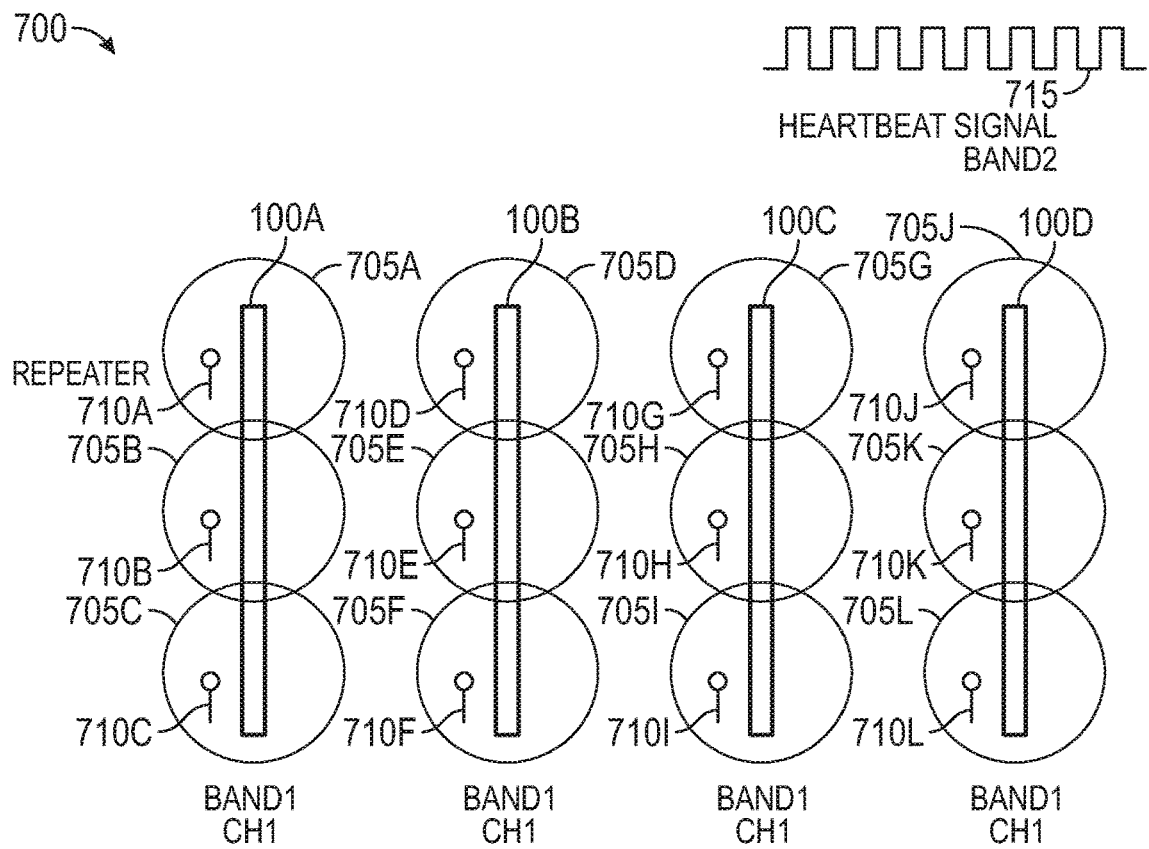
FIG. 7 illustrates assigning multiple repeaters with limited range to mitigate interference between tightly spaced machines, according to various embodiments.

FIG. 7 illustrates assigning multiple repeaters 710 (e.g., synchronized antennas to transmit the same signals on the same channel in parallel) with limited range to mitigate interference between tightly spaced machines 100, according to various embodiments. FIG. 7 illustrates a shared space 700 where each machine 100 includes multiple repeaters 710 (three repeaters 710 per machine 100 in this example, but the machines 100 could include any number) disposed at different locations along a length of the machines 100. In one embodiment, the repeaters 710 for the same machine transmit the same data—e.g., command signals—on the same channel or groups of channels. Because of the limited range of radiation patterns 705 for the repeaters 710, the neighboring machines 100 can use the same channel or group of channels to transmit the command signals simultaneously in the same frequency band. That is, the repeaters 710A-C transmit command signals to the robots in the machine 100A at the same time the repeaters 710D-F transmit command signals to the robots in the machine 100B on the same channel (Channel 1).

Instead of using directional antennas, antenna diversity, or MIMO, the radiation patterns 705 can be limited or controlled by the transmission power of the repeaters 710 or by using a frequency band with a limited transmission range (or a combination of both). For example, depending on the distance between the machines 100, the operator can reduce the transmission power of the repeaters 710 to ensure the radiation patterns 705 do not overlap a neighboring machine 100. As the distance between the machines 100 shrink, the operator may also reduce the transmission power to prevent interference. However, the operator may have to install additional repeaters 710 to cover the layout of the machines 100. For example, after reducing the radiation patterns 705, there may be dead spots (e.g., portions of the machine 100 that are not within any radiation pattern 705 of a repeater 710). As a result, the operator may need to space the repeaters 710 closer together along the length of the machines 100 and add another repeater 710 to remove the dead spot.

In another example, the repeaters 710 may operate in a frequency band with a smaller range than the 2.4 GHz and 5 GHz frequency bands. For example, the 60 GHz frequency band has a much smaller transmission distance than the 2.4 GHz and 5 GHz frequency bands. Thus, the repeaters 710 may transmit command signals using the 60 GHz frequency band which enables the machines 100 to be spaced closer together relative to using slower frequency bands. Moreover, in addition to transmitting in a faster frequency band (which has a shorter transmission distance), the operator can also reduce the transmission power of the repeaters 710 to further control the radiation patterns 705. In one embodiment, the repeaters 710 are directional antennas rather than omnidirectional antennas as shown in FIG. 7 and are arranged such that their corresponding radiation patterns extend primarily along the length of the assigned machine 100 rather than to a neighboring machine 100.

The heartbeat signal 715 may be assigned to the same frequency band used by the command signals (e.g., Frequency Band 1) or a different frequency band (e.g., Frequency Band 2). In one embodiment, each machine 100 includes a second set of repeaters 710 for transmitting an individually controllable heartbeat signal 715 for each machine which generates little or no interference with neighboring machines 100. In other embodiments, the heartbeat signal 715 is transmitted using a single antenna (e.g., without MIMO) in which case heartbeat signal 715 may be assigned different channels for the machines 100 to mitigate interference, or the signal 615 may be transmitted on the same channel and shared by multiple machines 100.

Figure 8:
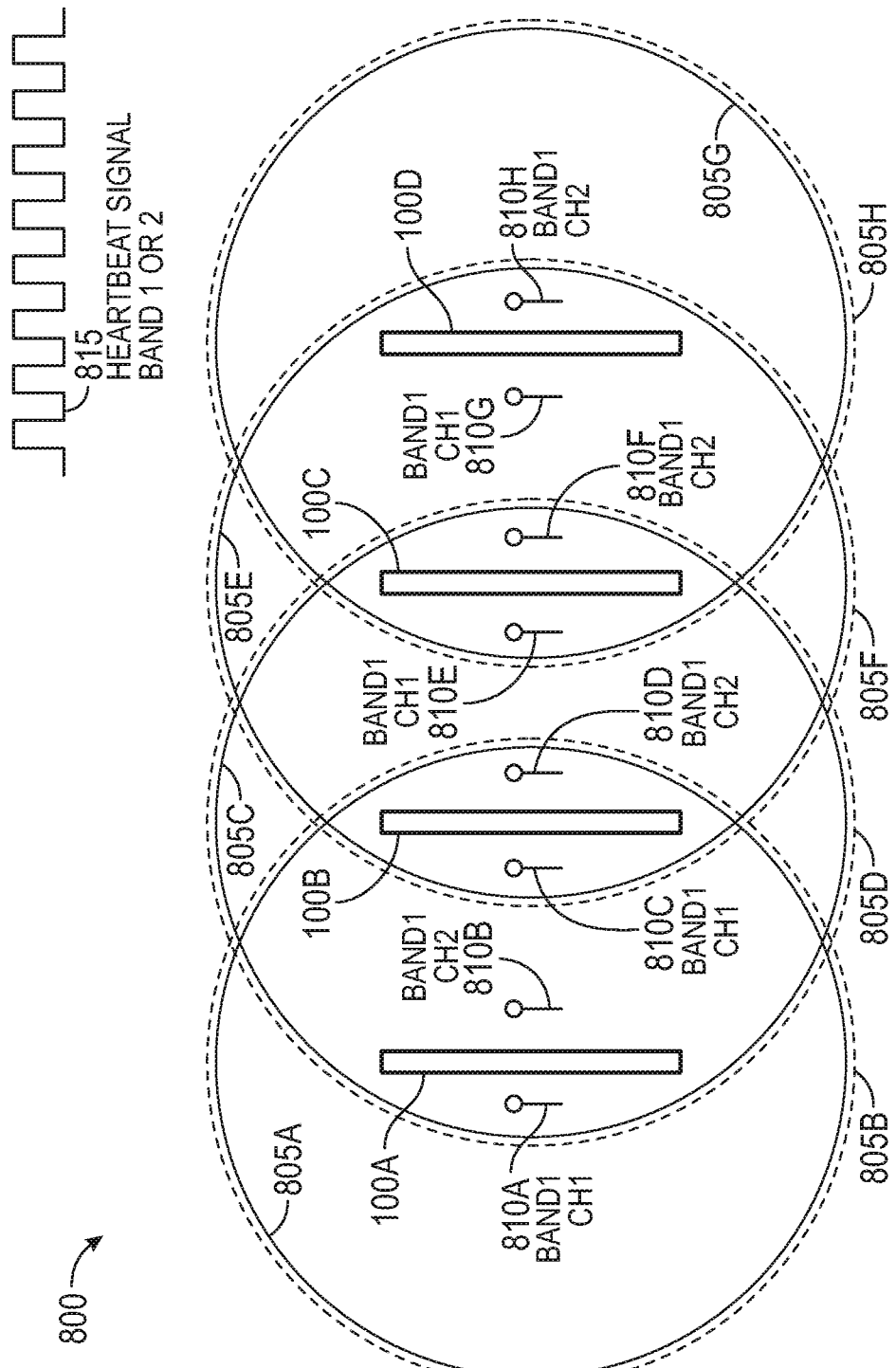
FIGS. 8 and 9 illustrate transmitting duplicate data on multiple channels to tightly spaced machines, according to various embodiments.

FIG. 8 illustrates transmitting duplicate data on multiple channels to tightly spaced machines 100, according to various embodiments. As shown, each machine 100 in the shared space 800 has two antennas 810 for transmitting command signals to the robots within the machine 100. For example, the machine 100A includes the antennas 810A and 810B which transmit the same command signals to the robots in the machine 100A. The remaining machines 100B-D also include a respective pair of antennas 810. In this embodiment, the antenna 810A has a radiation pattern 805A (shown as the solid line) for transmitting the command signals while the antenna 810B has a radiation pattern 805B (shown as the dashed line). Although the antennas 810A and 810B transmit the command signals at the same time, there is little or no interference between the signals because the antenna 810A uses Channel 1 of the Frequency Band 1 while the antenna 810B uses Channel 2 of the Frequency Band 1. The antenna pairs for the other machines 100B-D have a similar configuration.

Although the antenna pairs do not interfere with each other, the transmitted signals can interfere with neighboring machines as shown by the overlapping radiation patterns 805. That is, the command signals transmitted by the antennas 810A and 810C on the machines 100A and 100B may interfere since both antennas use Channel 1 to communicate and have radiation patterns 805 that extend to neighboring machines 100. Stated differently, the wireless signals emitted by the antenna 810A can be received by the robots in the machine 100B at the same time those robots are receiving command signals transmitted by the antenna 810C. The interference from the antenna 810A can prevent the robots in the machine 100B from receiving the commands emitted by the antenna 810C. However, because the master controller can send identical data (e.g., the same command signals) on both of the antennas 810C and 810D in the machine 100B using two different channels, the controller can reduce the likelihood that interference from a neighboring antennas prevent the robots from receiving the commands. In one embodiment, the distance between the machines 100 is controlled that it is unlikely that interference emitted by neighboring antennas prevent the robots from receiving the commands emitted by the pair of antennas for that machine 100. For example, the IEEE 802.11ad standard permits a receiver to select the best beam forming link from a two-channel receiver (with two antennas) depending on which channel signal path link has better performance. Thus, if Channel 1 is currently receiving a lot of interference, the receiver on the robots can receive the command signals using Channel 2. In this manner, the operator can re-use channels in neighboring machines 100 thereby freeing up available bandwidth while mitigating the likelihood that interference from neighboring antennas using the same channels prevents the robots from receiving command signals from at least one of the antennas assigned to the machine 100.

The heartbeat signal 815 may be assigned to the same frequency band used by the command signals (e.g., Frequency Band 1) or a different frequency band (e.g., Frequency Band 2). In one embodiment, each machine 100 includes a second set of antenna pairs for transmitting an individually controllable heartbeat signal 815 for each machine which generates little or no interference with neighboring machines 100. For example, each machine 100 may include two antennas for transmitting the heartbeat signal 815 on Frequency Band 2 using two different channels. The receivers in the robots can then select which of the channels provides the best version of the heartbeat signal. Thus, when a neighboring machine (which uses the same two channels to transmit its heartbeat signal 815) introduces interference on one of the channels, the receivers can receive the heartbeat signal using the other channel. While FIG. 8 illustrates using pairs of antennas to send out duplicate command or heartbeat signals, in other embodiments each machine may use three, four, or more antennas for transmitting duplicate command signals or the heartbeat signal 815 on additional channels (e.g., Channels 3, 4, 5, etc.) to reduce the likelihood that interference can prevent the robots from receiving on all the channels.

Figure 9:
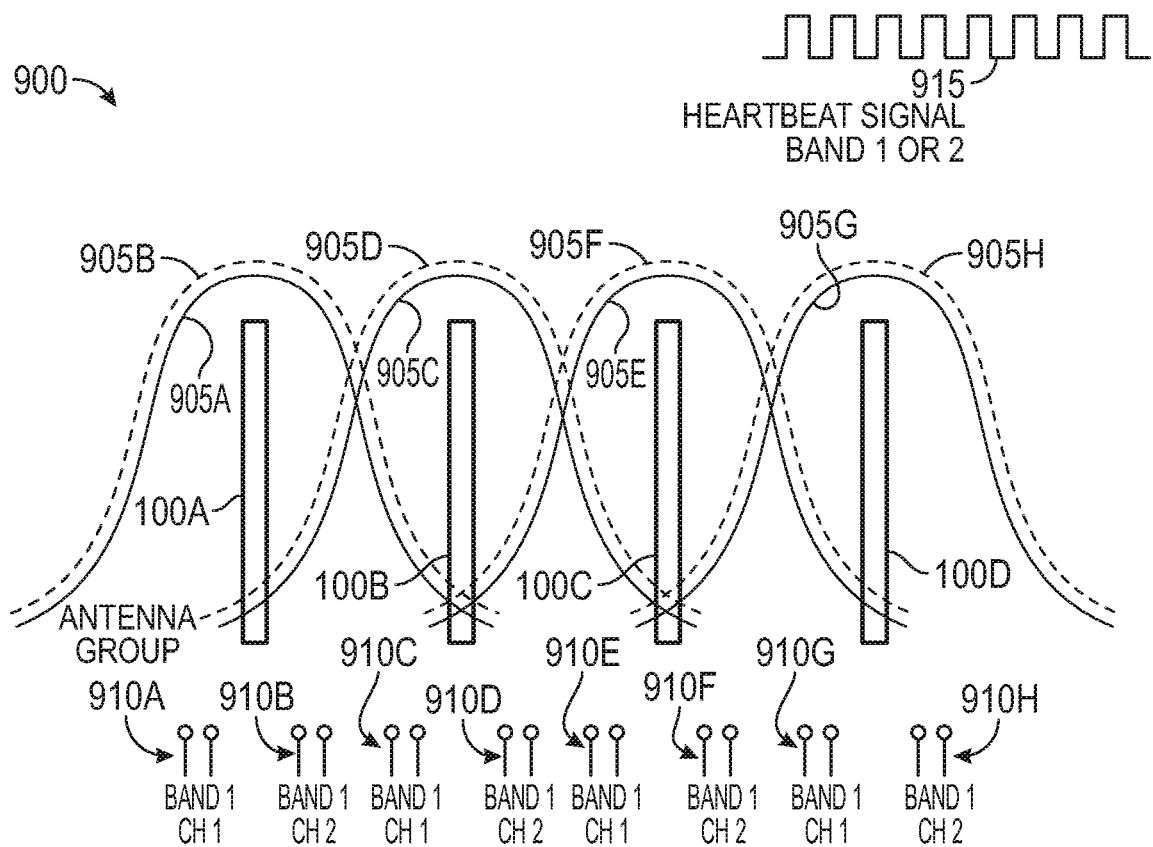

FIG. 9 illustrates transmitting duplicate data on multiple channels to tightly spaced machines, according to various embodiments. Like in FIG. 8, each machine 100 in the shared space 900 has at least two antennas for transmitting duplicate data (e.g., either command signals or the heartbeat signal 915) to the robots in the machines. However, unlike in FIG. 8 where only one antenna transmits in each channel, in FIG. 9, multiple antennas (e.g., antenna groups 910) are assigned to each channel. That is, the antenna group 910A uses Channel 1 to transmit command or heartbeat signals to the robots in the machine 100A while the antenna group 910B uses Channel 2 to transmit duplicate data to the robots in the machine 100A. These channels are then re-used by the neighboring machines. That is, the antenna groups 910C and 910D which transmit duplicate data to the robots in the machine 100B also use Channel 1 and 2, respectively. As mentioned above, the robots can have multiple antennas for receiving the duplicate data and select which signal has the best channel signal path link.

Moreover, because each antenna group 910 includes multiple antennas, the groups 910 can use antenna diversity and MIMO to reduce inter-machine interference. As shown, the radiation patterns 905 corresponding to each of the antenna groups 910 are not omnidirectional like the radiation patterns 805 in FIG. 8. For example, the radiation pattern 905A shown by the solid line (Which corresponds to the antenna group 910A) and the radiation pattern 905B shown by the dashed line (which corresponds to the antenna group 910B) have main lopes that primarily cover the machine 100A. The radiation patterns 905A and 905B may have nulls at the locations of the other machines 100B-D in the shared space 900 thereby further mitigating the likelihood that the wireless signals emitted by the antennas in the shared groups 910A and 910B interfere with neighboring machines 100. Thus, the pair of antenna groups 910 assigned to each machine 100 can use the channels that are also used by the antenna groups 910 in neighboring machines 100 as shown. In this manner, the available bandwidth is increased so that the machines 100 can be tightly spaced even if the radiation patterns 905 may overlap with, or cause interference at, neighboring machines 100.

The heartbeat signal 915 may be assigned to the same frequency band used by the command signals (e.g., Frequency Band 1) or a different frequency band (e.g., Frequency Band 2). In one embodiment, each machine 100 includes a second set or pair of antenna groups 910 for transmitting an individually controllable heartbeat signal 915 for each machine which generates little or no interference with neighboring machines 100. For example, each machine 100 may include four antennas arranged in two new antenna groups 910 for transmitting the heartbeat signal 915 on Frequency Band 2 using two different channels. The receivers in the robots can then select which of the channels provides the best version of the heartbeat signal. Thus, when a neighboring machine (which uses the same two channels to transmit its heartbeat signal 915) introduces interference on one of the channels, the receivers can receive the heartbeat signal using the other channel. While FIG. 9 illustrates using two antennas in each antenna group 910 to send out duplicate command or heartbeat signals, in other embodiments each machine may use three, four, or more antennas per group 910 for transmitting duplicate command signals or the heartbeat signal 915 to reduce the likelihood that interference can prevent the robots from receiving on all the channels.

Except as otherwise stated, the frequency bands discussed above can be interchanged. For example, the frequency bands can be the 2.4 GHz, 5 Ghz, 60 GHz, or other frequency bands. Moreover, the selection of the frequency bands for the embodiments described above can depend on the desired spacing or distance between the machines. For example, as distance between the machines 100 is reduced or available bandwidth on the 2.4 GHz or 5 GHz frequency bands is reduced, the command signals may be transmitted using the 60 GHz frequency band while the heartbeat signal is transmitted on a different frequency band.

Figure 10:
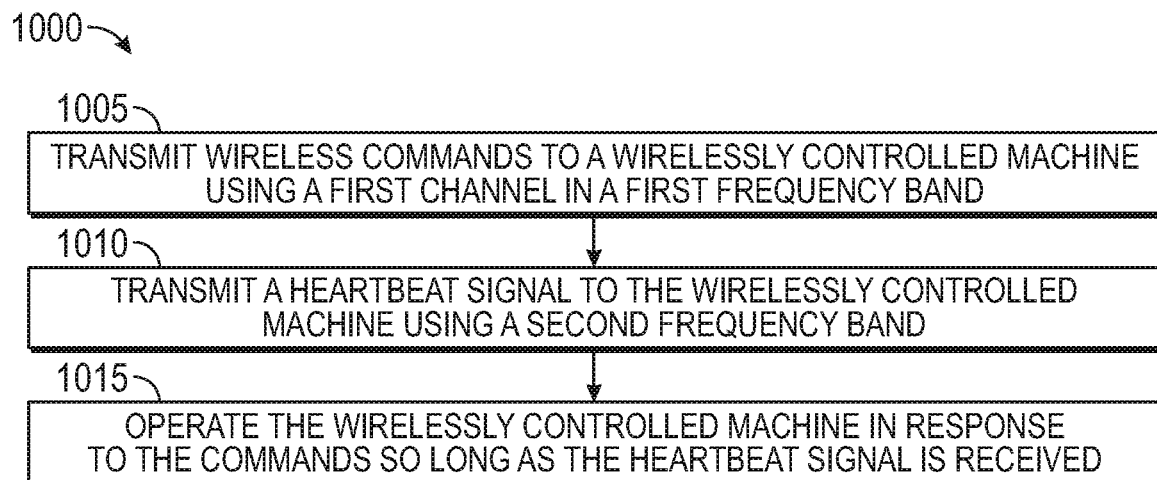
FIG. 10 is a flowchart for transmitting command and heartbeat signals on different frequency bands, according to various embodiments.

FIG. 10 is a flowchart of a method 1000 for transmitting command and heartbeat signals on different frequency bands, according to various embodiments. At block 1005, the master controller transmits wireless commands to a wireless controlled machine (which may include one or more individual controlled robots) using a first channel in a first frequency band. At block 1010, the heartbeat controller transmits the heartbeat signal using a second frequency band. In one embodiment, blocks 1005 and 1010 occur in parallel. Further, the method 1000 may include controlling the wireless command and heartbeat signals transmitted to neighboring wirelessly machines to mitigate interference as described in the embodiments above for FIGS. 3, 4A-4B, 5, 6, and 7.

At block 1015, the wirelessly controlled machine operates in response to the received command so long as the heartbeat signal is received. Put differently, if the heartbeat control stops transmitting the heartbeat signal, the wireless controlled machine stops performing the received commands. Once the heartbeat signals resumes, the wireless controlled machine can again resume performing the commands received from the master controller.

Figure 11:
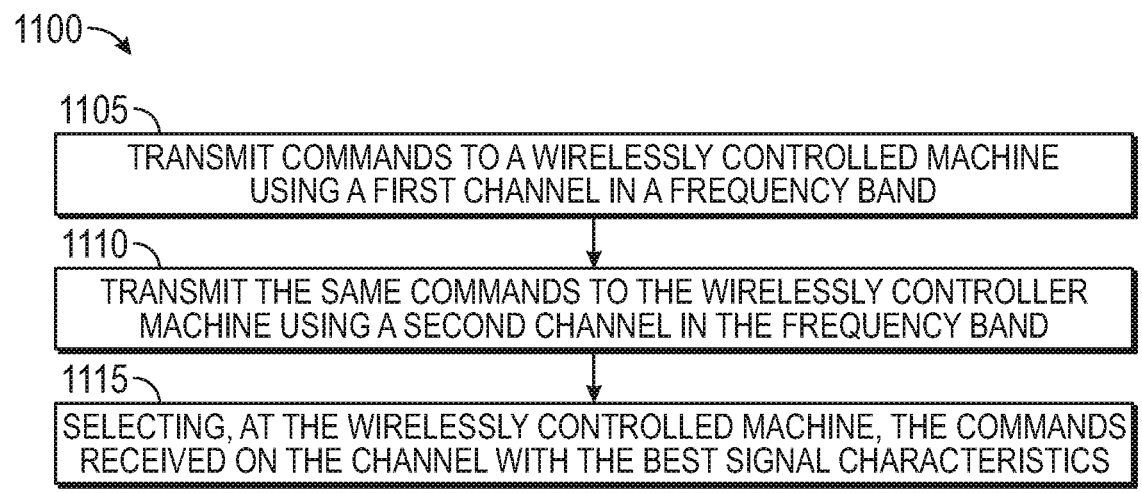
FIG. 11 is a flowchart for transmitting duplicate data using two channels in the same frequency band, according to various embodiments.

FIG. 11 is a flowchart of a method 1100 for transmitting duplicate data using two channels in the same frequency band, according to various embodiments. At block 1105, the master controller transmits commands to a wirelessly controlled machine using a first channel in a frequency band. At block 1110, the master controller transmits the same commands to the wirelessly controlled machine using a second channel in the frequency band. In one embodiment, blocks 1005 and 1010 occur in parallel. Further, the method 1100 may include controlling the wireless command and heartbeat signals transmitted to neighboring wirelessly machines to mitigate interference as described in the embodiments above for FIGS. 8, and 9.

At block 1115, the wirelessly controlled machine selects the commands received on the channel with the best signal characteristic. For example, the machine may select the data from the channel that has the most gain or the best signal to noise ratio. In one embodiment, when using the 60 GHz frequency band, the technique for selecting which of the channels to use is described in IEEE 802.11ad for selecting the best beam forming link from a two-channel receiver depending on which channel signal path link has better performance or signal characteristics.

Figure 12:
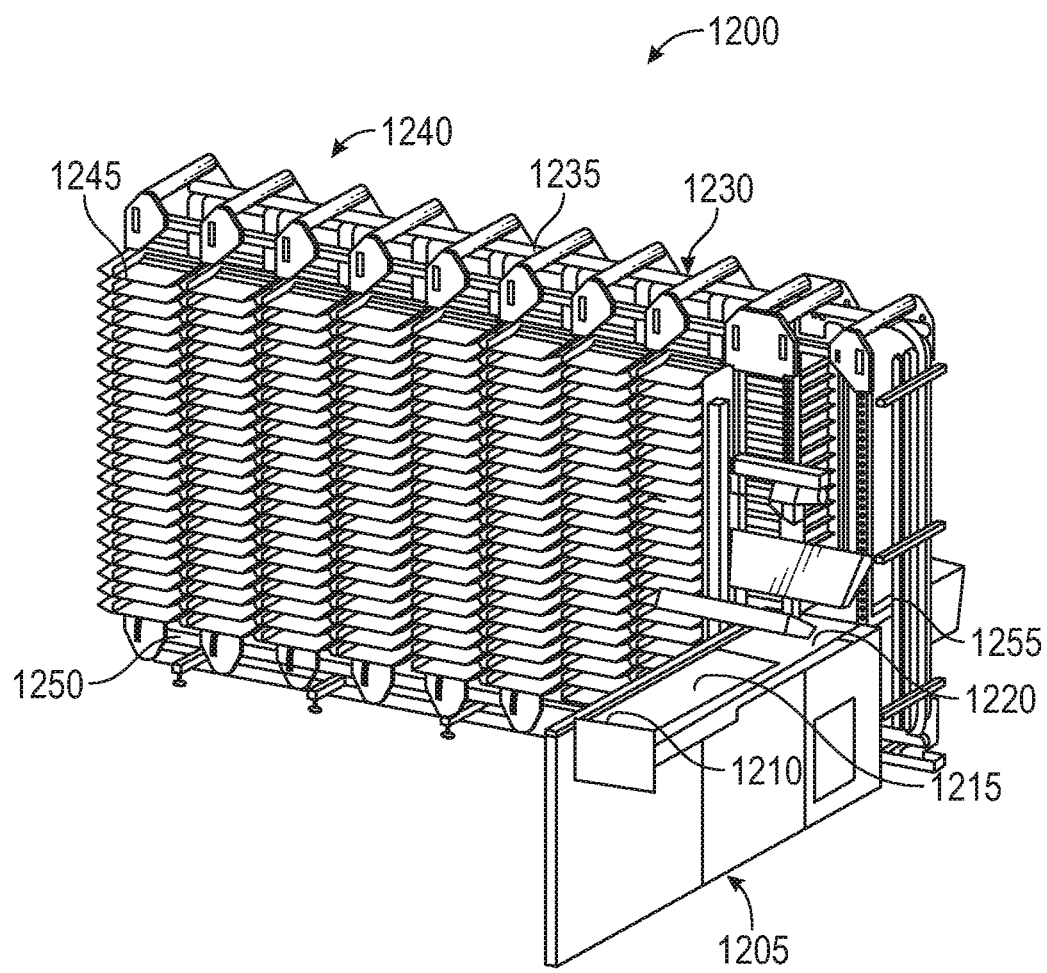
FIGS. 12 and 13 illustrate an apparatus for sorting items, according to various embodiments.
Figure 13:
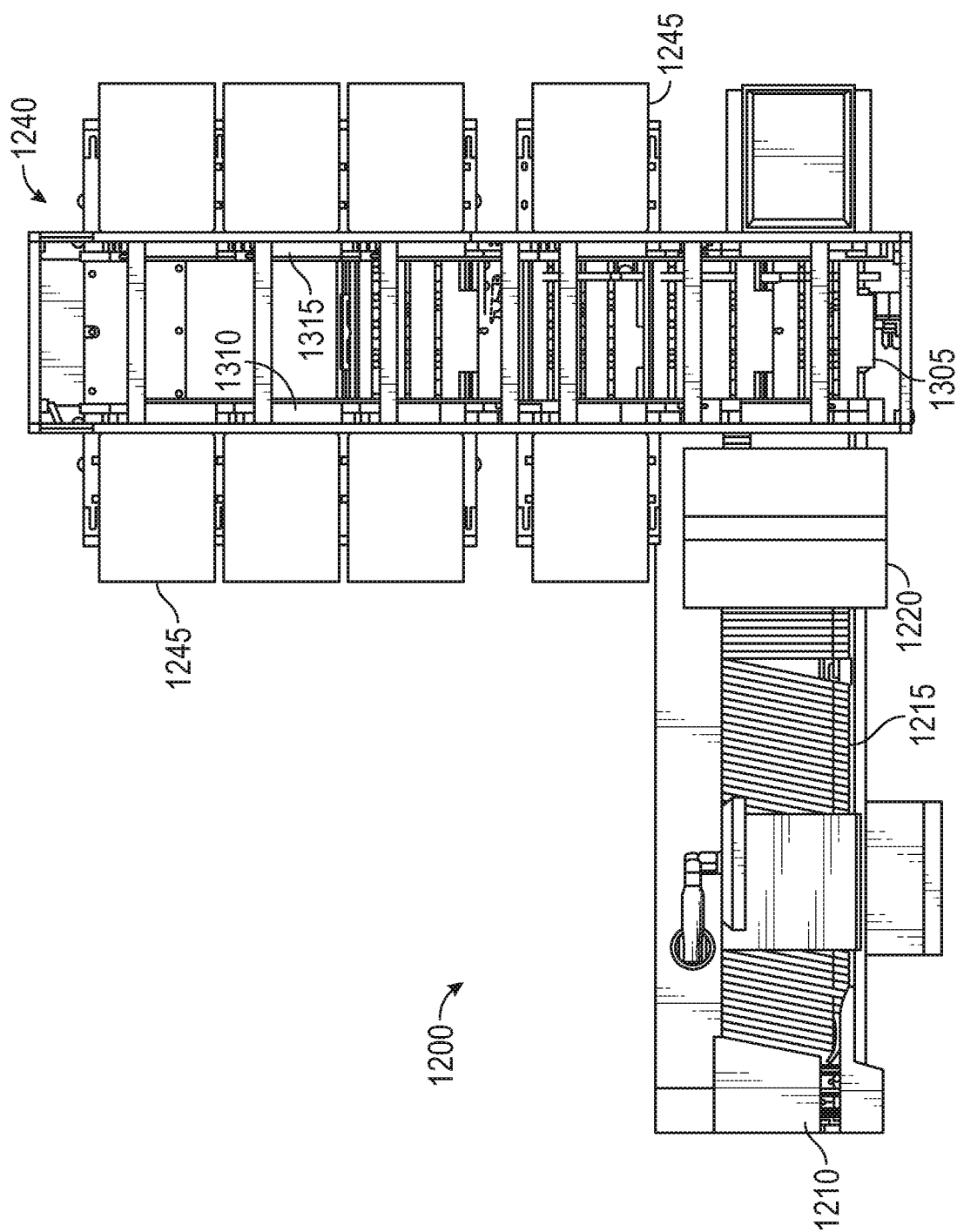

Referring now to FIGS. 12 and 13, an apparatus which is one example of an item sortation machine 100 shown in FIG. 1 for sorting items such as documents or mail pieces is designated generally 1200. The system 1200 includes a plurality of delivery cars 1305 (e.g., the robots 140 shown in FIG. 1) to deliver items (e.g., item 125) to a plurality of sort locations, such as output bins 1245 (e.g., containers 180). At a loading station 1255, each car 1305 receives an item from an input station 1205 and delivers it to the appropriate bin.

The cars 1305 travel along a track 1230 to the sort locations. The track has a horizontal upper rail 1235 and a horizontal lower rail 1250, which operates as a return leg. A number of parallel vertical track legs extend between the upper rail 1235 and the lower return rail 1250. In the present instance, the bins 1245 are arranged in columns between the vertical track legs.

After a piece is loaded onto a car, the car travels upwardly along two pairs of vertical tracks legs and then horizontally along two upper tracks 1235. The car 1305 travels along the upper rail until it reaches the appropriate column containing the bin for the piece that the car is carrying. The track 1230 may include gates to direct the car 1305 down the vertical legs where the car stops at the appropriate bin. The car 1305 then discharges the piece into the bin using a transport device or system.

After discharging the piece, the car 1305 continues down the vertical legs of the column until it reaches the lower rail 1250 which the car follows until returning to the loading station 1255 to receive another item.

The cars 1305 are semi-autonomous vehicles that each have an onboard power source (e.g., power source 155) and an onboard motor (e.g., a movement system 150) to drive the cars along the track 1230. The cars also include a loading/unloading mechanism (e.g., the transport device 145), such as a conveyor, for loading pieces onto the cars and discharging the pieces from the cars.

Since the system 1200 includes a number of cars 1305, the positioning of the cars is controlled to ensure that the different cars do not crash into each other. In one embodiment, the system 1200 uses a master controller (e.g., the master controller 110 in control system 105) that tracks the position of each car 1305 and provides wireless commands to each car to control the progress of the cars along the track. The master controller may also control operation of the various elements along the track, such as the gates. Further, the control system may output a heartbeat signal, e.g., using a heartbeat controller 115. The cars 1305 perform the commands to move the pieces throughout the apparatus 1200 so long as the heartbeat signal is active as described above.

At the input station 1205, the mail pieces are separated from one another so that the pieces can be conveyed serially to the loading station 1255 to be loaded onto the cars 1305. Additionally, at the input station information is determined for each piece using, for example, a bar code scanner or a mailing address so that the piece can be sorted to the appropriate bin.

A variety of configurations may be used for the input station, including manual or automatic configurations or a combination of manual and automated features. In a manual system, the operator enters information for each piece and the system sorts the mail piece accordingly. In an automatic system, the input system includes elements that scan each mail piece and detect information regarding each piece. The system then sorts the mail piece according to the scanned information.

In an exemplary manual configuration, the input system includes a work station having a conveyor, an input device, and a monitor. The operator reads information from a mail piece and then drops the piece onto a conveyor that conveys the piece to the loading station 1255.

In an exemplary automatic configuration, the system includes an imaging station, having an imaging device such as a high speed line scanning camera. In one example, the imaging station scans a bar code on each mail piece to detect information regarding the destination for each piece. The system analyzes the image data to determine the destination information and then controls the cars to move the piece into a bin corresponding to the destination.

FIGS. 12 and 13 illustrate such an automated system. A feeder 1210 in the input bin serially feeds mail pieces from the input bin to a conveyor 1215. An imaging station 1220 positioned along the conveyor scans the mails pieces as the pieces are conveyed to the loading station 1255. The system 1200 analyzes a bar code or mailing address to read information for the mail piece.

The conveyor 1215 conveys the mail piece to the loading station 1255 where it is loaded onto a car 1305.

The input station 1205 may be configured in a wide range of options. The options are not limited to those configurations described above, and may include additional features, such as an automated scale for weighing each piece, a labeler for selectively applying labels to the mail pieces and a printer for printing information on the mail pieces or on the labels.

In one embodiment, the system 1200 includes a plurality of input stations which may increase the feed rate of pieces. In addition, the input stations may be configured to process different types of items. In this way, each input station could be configured to efficiently process a particular category of items. For instance, if the system is configured to process documents, such as mail, one input station may be configured to process standard envelopes, while another input station may be configured to process larger mails, such as flats. Similarly, one input station may be configured to automatically process mail by scanning it and automatically determining the recipient. The second input station may be configured to process rejects, such as by manually keying in information regarding the recipient.

The system includes a sorting station 1240 which includes an array of bins 1245 for receiving the pieces. Additionally, the sorting station 1240 includes the track 1230 for guiding the cars 1305 to the bins 1245.

In one embodiment, during transport, the cars travel up a pair of vertical legs from the loading station 1255 to the upper rail 1235 (in one example, the cars actually travel up two pairs of rails because the track includes a forward track and a parallel opposing track). The car then travels along the upper rail until reaching the column having the appropriate bin. The car then travels downwardly along two front vertical posts and two parallel rear posts until reaching the appropriate bin, and then discharges the mail piece into the bin. The car then continues down the vertical legs until reaching the lower horizontal leg 1250. The car then follows the lower rail back toward the loading station.

As can be seen in FIG. 13, the track 1230 includes a front track 1310 and a rear track 1315. The front and rear tracks 1310, 1315 are parallel tracks that cooperate to guide the cars around the track. In one embodiment, each of the cars includes four wheels: two forward wheel and two rearward wheels. The forward wheels ride in the front track, while the rearward wheels ride in the rear track. It should be understood that in the discussion of the track the front and rear tracks 1310, 1315 are similarly configured opposing tracks that support the forward and rearward wheels of the cars. Accordingly, a description of a portion of either the front or rear track also applies to the opposing front or rear track.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a first wirelessly controlled machine comprising a plurality of wirelessly controlled robots comprising a plurality of receive antennas; and
   a control system comprising at least one transmit antenna, wherein the control system is configured to:
   wirelessly transmit first commands to the plurality of wirelessly controlled robots in the first machine using a first frequency band, and
   wirelessly transmit a first heartbeat signal to the plurality of wirelessly controlled robots in the first machine using a second frequency band different from the first frequency band to mitigate interference between the first commands and the first heartbeat signal, wherein the first commands are different from the first heartbeat signal and the first commands are wirelessly transmitted in parallel with the first heartbeat signal, wherein the plurality of wirelessly controlled robots in the first machine performs the first commands so long as the first heartbeat signal is received.

2. The system of claim 1, wherein the control system is configured to:
   transmit the first commands during a first timeslot and not transmit the first commands during a second timeslot; and
   transmit the first heartbeat signal during both the first and second timeslots.

3. The system of claim 1, further comprising:
   a second wirelessly controlled machine disposed in a shared space with the first machine, wherein at least one of the first commands and the first heartbeat signal reach a receive antenna in the second machine,
   wherein the control system is configured to wirelessly transmit second commands to the receive antenna of the second machine using a first channel in the first frequency band, wherein the first commands are transmitted to the plurality of wirelessly controlled robots using a second channel in the first frequency band.

4. The system of claim 3, wherein the control system is configured to wirelessly transmit a second heartbeat signal to the receive antenna of the second machine using a first channel in the second frequency band, wherein the first heartbeat signal are transmitted to the first machine using a second channel in the second frequency band.

5. The system of claim 1, further comprising:
   a plurality of transmit antennas comprising the at least one transmit antenna, wherein the control system is configured to, using the plurality of transmit antennas, transmit the first commands to the first machine using multiple-input-multiple-output (MIMO).

6. The system of claim 1, further comprising:
   a plurality of repeaters comprising the at least one transmit antenna that is disposed at different locations along a length of the first machine, wherein the control system is configured to transmit the first commands to the plurality of wirelessly controlled robots using the plurality of repeaters, wherein the plurality of repeaters uses a same channel in the first frequency band to transmit the first commands.

7. The system of claim 1, further comprising:
   a second wirelessly controlled machine disposed in a shared space with the first machine; and
   a third wirelessly controlled machine disposed in the shared space, wherein the third machine is spaced a greater distance from the first machine than the second machine in the shared space,
   wherein the control system is configured to wirelessly transmit the first commands to the plurality of wirelessly controlled robots using a first channel in the first frequency band, wirelessly transmit second commands to the second machine using a second channel in the first frequency band, and wirelessly transmit third commands to the third machine using the first channel in the first frequency band.

8. The system of claim 1, wherein the at least one transmit antenna is a directional antenna arranged to point a main lobe of a radiation pattern along a length of the first machine and point a null of the radiation pattern towards a second wirelessly controlled machine disposed in a shared space with the first machine.

9. The system of claim 1, wherein the plurality of wirelessly controlled robots each receives the first commands using a same channel in the first frequency band.

10. A method, comprising:
    wirelessly transmitting first commands to a plurality of wirelessly controlled robots in a first wirelessly controlled machine using a first frequency band, wherein the plurality of wirelessly controlled robots comprises a plurality of receive antennas; and
    wirelessly transmitting a first heartbeat signal to the plurality of wirelessly controlled robots in the first machine using a second frequency band different from the first frequency band to mitigate interference between the first commands and the first heartbeat signal, wherein the first commands are different from the first heartbeat signal and the first commands are wirelessly transmitted in parallel with the first heartbeat signal, wherein the plurality of wirelessly controlled robots in the first machine performs the first commands so long as the first heartbeat signal is received.

11. The method of claim 10, further comprising:
    transmitting the first commands during a first timeslot and not transmitting the first commands during a second timeslot; and
    transmitting the first heartbeat signal during both the first and second timeslots.

12. The method of claim 10, further comprising:
    wirelessly transmitting second commands to a receive antenna of a second wirelessly controller machine using a first channel in the first frequency band, wherein the first commands are transmitted to the plurality of wirelessly controlled robots using a second channel in the first frequency band, and wherein at least one of the first commands and the first heartbeat signal reach the receive antenna in the second machine.

13. The method of claim 12, further comprising:
    wirelessly transmitting a second heartbeat signal to the receive antenna of the second wirelessly controller machine using a first channel in the second frequency band, wherein the first heartbeat signal is transmitted to the first machine using a second channel in the second frequency band.

14. The method of claim 10, wherein transmitting the first commands to the plurality of wirelessly controlled robots first comprises:
    transmitting the first commands to the first machine using a plurality of transmit antennas and MIMO.

15. The method of claim 10, wherein transmitting the first commands to the plurality of wirelessly controlled robots comprises:

transmitting the first commands using a plurality of repeaters disposed at different locations along a length of the first machine, wherein the plurality of repeaters uses a same channel in the first frequency band to transmit the first commands.

16. The method of claim 10, further comprising:
wirelessly transmitting the first commands to the plurality of wirelessly controlled robots using a first channel in the first frequency band;
wirelessly transmitting second commands to a second wirelessly controlled machine using a second channel in the first frequency band; and
wirelessly transmitting third commands to a third wirelessly controlled machine using the first channel in the first frequency band, wherein the third machine is spaced a greater distance from the first machine than the second machine in a shared space.

17. The method of claim 10, wherein a transmit antenna used to transmit the first commands is a directional antenna arranged to point a main lobe of a radiation pattern along a length of the first machine and point a null of the radiation pattern towards a second wirelessly controlled machine disposed in a shared space with the first machine.

18. The method of claim 10, wherein the plurality of wirelessly controlled robots each receives the first commands using a same channel in the first frequency band.

* * * * *

UNITED STATES PATENT AND TRADEMARK OFFICE
CERTIFICATE OF CORRECTION

PATENT NO. : 10,701,586 B2
APPLICATION NO. : 16/376871
DATED : June 30, 2020
INVENTOR(S) : Sachin Rajendra Kothari et al.

It is certified that error appears in the above-identified patent and that said Letters Patent is hereby corrected as shown below:

In the Claims

In Column 22, Line 62, in Claim 14, before "comprises:" delete "first".

Signed and Sealed this
Eleventh Day of August, 2020

Andrei Iancu
*Director of the United States Patent and Trademark Office*